(12) United States Patent
Thor

(10) Patent No.: US 11,761,536 B2
(45) Date of Patent: Sep. 19, 2023

(54) PUMP SEAL

(71) Applicant: Chart Inc., Ball Ground, GA (US)

(72) Inventor: Eric Thor, Arden Hills, MN (US)

(73) Assignee: Chart Inc., Ball Ground, GA (US)

( * ) Notice: Subject to any disclaimer, the term of this patent is extended or adjusted under 35 U.S.C. 154(b) by 0 days.

(21) Appl. No.: 17/375,756

(22) Filed: Jul. 14, 2021

(65) Prior Publication Data

US 2022/0018435 A1   Jan. 20, 2022

Related U.S. Application Data

(60) Provisional application No. 63/052,018, filed on Jul. 15, 2020.

(51) Int. Cl.
| | | |
|---|---|---|
| *F16J 9/06* | (2006.01) | |
| *F16J 7/00* | (2006.01) | |
| *F16J 15/3268* | (2016.01) | |

(52) U.S. Cl.
CPC . *F16J 9/06* (2013.01); *F16J 7/00* (2013.01); *F16J 15/3268* (2013.01)

(58) Field of Classification Search
CPC .... F16J 9/06; F16J 7/00; F16J 15/3284; F16J 15/3268; F16J 15/3212; F16J 15/3236; F16J 15/3208; F16J 15/3252; F16J 15/186; F16J 15/20; F04B 37/12; F04B 39/0005; F04B 39/12
See application file for complete search history.

(56) References Cited

U.S. PATENT DOCUMENTS

| | | | | |
|---|---|---|---|---|
| 4,448,424 A | * | 5/1984 | Ernst | F16J 15/56 277/411 |
| 4,822,255 A | * | 4/1989 | Eickmann | F01B 19/00 92/45 |
| 4,991,495 A | * | 2/1991 | Loegel, Sr. | F16J 15/48 92/153 |
| 5,992,856 A | * | 11/1999 | Balsells | F16J 15/3212 277/564 |
| 6,099,274 A | | 8/2000 | Conn | |
| 6,547,250 B1 | * | 4/2003 | Noble | F16J 15/164 277/471 |

(Continued)

FOREIGN PATENT DOCUMENTS

| | | |
|---|---|---|
| CN | 210135240 U | 3/2020 |
| CN | 210715935 U | 6/2020 |

(Continued)

OTHER PUBLICATIONS

Extended European Search Report dated Dec. 3, 2021 for European Application No. 21185909.5.

*Primary Examiner* — Grant Moubry
(74) *Attorney, Agent, or Firm* — Cook Alex Ltd.

(57) ABSTRACT

An annular seal for sealing an opening in a pump housing surrounding a piston rod includes a primary sealing portion with an inner surface adjacent to the piston rod and an outer surface adjacent to the pump housing. An initial sealing portion features an inner wall and an outer wall so that an annular space is defined therebetween. A top wall extends between the inner and outer walls. A coil spring is positioned within the annular space of the initial sealing portion and urges the inner wall into engagement with the piston rod and the outer wall into engagement with the pump housing.

20 Claims, 5 Drawing Sheets

(56) References Cited

U.S. PATENT DOCUMENTS

| | | | | |
|---|---|---|---|---|
| 8,561,523 B2* | 10/2013 | Riley | ............... | F04B 53/143 |
| | | | | 92/240 |
| 2001/0039875 A1* | 11/2001 | Pecca | ............... | F04B 53/164 |
| | | | | 92/155 |
| 2010/0237565 A1* | 9/2010 | Foster | ............... | F16J 15/3236 |
| | | | | 277/377 |
| 2013/0043660 A1* | 2/2013 | Daub | ............... | H01M 50/213 |
| | | | | 29/527.1 |
| 2013/0043661 A1* | 2/2013 | Binder | ............... | F16J 15/322 |
| | | | | 277/584 |
| 2017/0074403 A1 | 3/2017 | Almeida et al. | | |
| 2020/0200161 A1* | 6/2020 | Caloone | ............... | F04B 39/041 |

FOREIGN PATENT DOCUMENTS

| | | |
|---|---|---|
| EP | 2233798 A1 | 9/2010 |
| WO | 0216809 A3 | 2/2002 |

\* cited by examiner

PUMP SEAL

CLAIM OF PRIORITY

This application claims the benefit of U.S. Provisional Application No. 63/052,018, filed Jul. 15, 2020, the contents of which are hereby incorporated by reference.

FIELD OF THE DISCLOSURE

The present disclosure relates generally to seals for use in pumps and, more particularly, to improved annular seals for pumps used in cryogenic systems and processes.

BACKGROUND OF THE INVENTION

Reciprocating pumps, particularly piston pumps, are extremely useful in cryogenic liquid dispensing and processing applications. High pressure piston pumps in particular are often utilized in cryogenic systems and processes, especially for delivering compressed gases from Liquid Cryogenic fluids.

The movement of the piston rod in a piston pump requires a sealing structure between the piston and pump housing for the prevention of leaking liquid. The piston rod constantly sliding against the seal will wear the seal, which often leads to leaks. If the seal contains fillers of harder materials, these can often scratch or abrade the piston rod or cylinder wall which can also lead to leaks.

Piston pumps utilized in cryogenic systems have the additional challenge of components which undergo thermal contraction and expansion changes. Building a pump for a cryogenic system requires anticipating the dimensions of the components in the cold condition, yet the parts are dimensioned and built in the warm (ambient temperature) condition. If gaps are too large, the seals will extrude thru the gaps resulting in premature seal failure. If the gaps are too small, components will abrade against each other leading to general failure.

The state of the art for reciprocating pump seals in cryogenic systems is the cup seal which may contain a spring. Although the cup seals, particularly the ones including springs, are effective, the seals still typically fail after several tens to hundreds of hours of use. This prompts maintenance in pumps that otherwise would likely not require maintenance for years.

A piston pump seal structure with extended life for a cryogenic system is desirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an annular seal for sealing an opening in a pump housing surrounding a piston rod includes a primary sealing portion with an inner surface adjacent the piston rod and an outer surface adjacent the pump housing, an initial sealing portion featuring an inner wall and an outer wall so that an annular space is defined therebetween and a top wall extending between the inner and outer walls, and a coil spring positioned within the annular space of the initial sealing portion and configured so as to urge the inner wall into engagement with the piston rod and the outer wall into engagement with the pump housing. The primary sealing portion and the initial sealing portion are integrally formed together.

In another aspect, an annular seal for sealing an opening in a pump housing surrounding a piston rod includes a primary sealing portion with an inner surface adjacent the piston rod and an outer surface adjacent the pump housing, an initial sealing portion featuring an inner wall and an outer wall so that an annular space is defined therebetween and an O-Ring positioned within the annular space of the initial sealing portion and configured so as to urge the inner wall into engagement with the piston rod and the outer wall into engagement with the pump housing. The primary sealing portion and the initial sealing portion are integrally formed together.

In another aspect, a pump for a cryogenic system includes a piston rod, a pump housing, a retaining nut, a cylinder, and an annular seal. The annular seal includes a primary sealing portion with an inner surface adjacent the piston rod and an outer surface adjacent the pump housing, an initial sealing portion featuring an inner wall and an outer wall so that an annular space is defined therebetween and a top wall extending between the inner and outer walls, and a coil spring positioned within the annular space of the initial sealing portion and configured so as to urge the inner wall into engagement with the piston rod and the outer wall into engagement with the pump housing. The primary sealing portion and the initial sealing portion are integrally formed together.

DETAILED DESCRIPTION OF EMBODIMENTS

Figure 1:
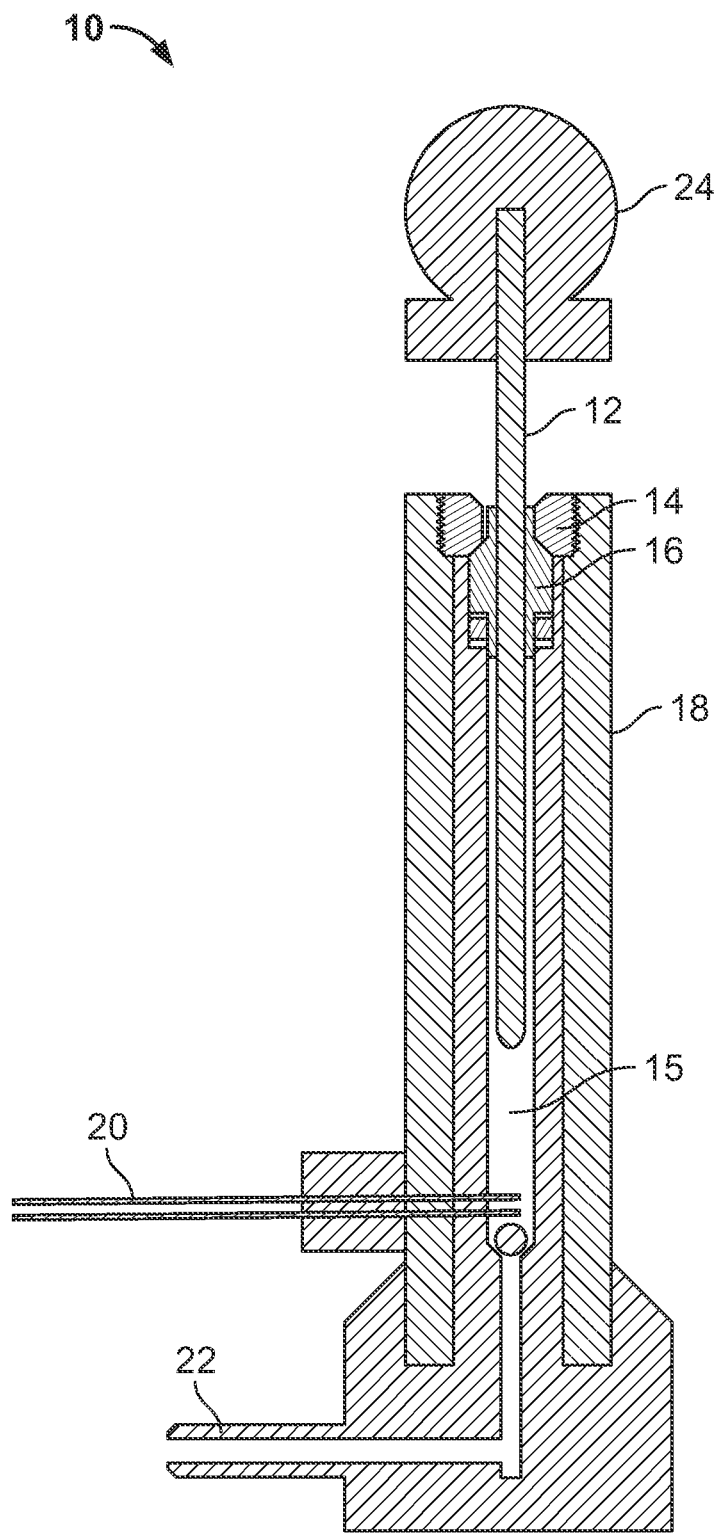
FIG. 1 is a schematic cross section of a first embodiment of a pump of the disclosure.

A first embodiment of a pump of the disclosure is indicated in general at 10 in FIG. 1. While the embodiments of the disclosure are presented below as piston pumps for cryogenic systems, it is to be understood that the technology may be used for pumps in alternative applications. Although the pump of FIG. 1 has a specific arrangement, the piston pump of the disclosure may be arranged alternatively within the scope of this disclosure.

The pump 10 is a positive displacement pump. A motor 24, drives the pump 10 via a drive rod or piston rod 12 in a pump housing 18. The pump includes an inlet port 22 and an outlet port 20, both in liquid communication with the cylinder 15. The inlet port 22 of the pump 10 receives the liquid for pumping and includes a check valve (which may include a ball as illustrated in FIG. 1). The outlet port 20 is in fluid communication with a transfer line for transferring the liquid.

The pump 10 also includes a retaining nut 14 and annular seal 16. The annular seal 16 functions to prevent liquid from escaping during the use of the pump and prevent excessive wearing on the piston rod 12 and/or housing 18.

The piston rod, housing, cylinder, retaining nut and ports may be comprised of different metals and metal alloys including, but not limited to, iron, nickel, copper, cobalt, titanium, stainless steel and combinations thereof.

The pump may be an integral component of a cryogenic system. The pump may be associated with a sump and various conduits, tanks and gauges of the cryogenic system.

In operation, liquid is pulled into the pump cylinder 15 through the inlet port 22 with the piston rod 12 upstroke or fill stroke. Liquid is then discharged from the cylinder 15 through the outlet port 20 with the piston rod downstroke or discharge stroke. The upstroke and downstroke of the piston rod cause the potential wearing of the seal and can lead to liquid leaking from the pump.

The pump 10 and seal 16 of FIG. 1 provide a pump with an efficient seal, providing a significant increase in seal lifespan and reduced maintenance issues in pumps, especially pumps in cryogenic systems.

Figure 2:
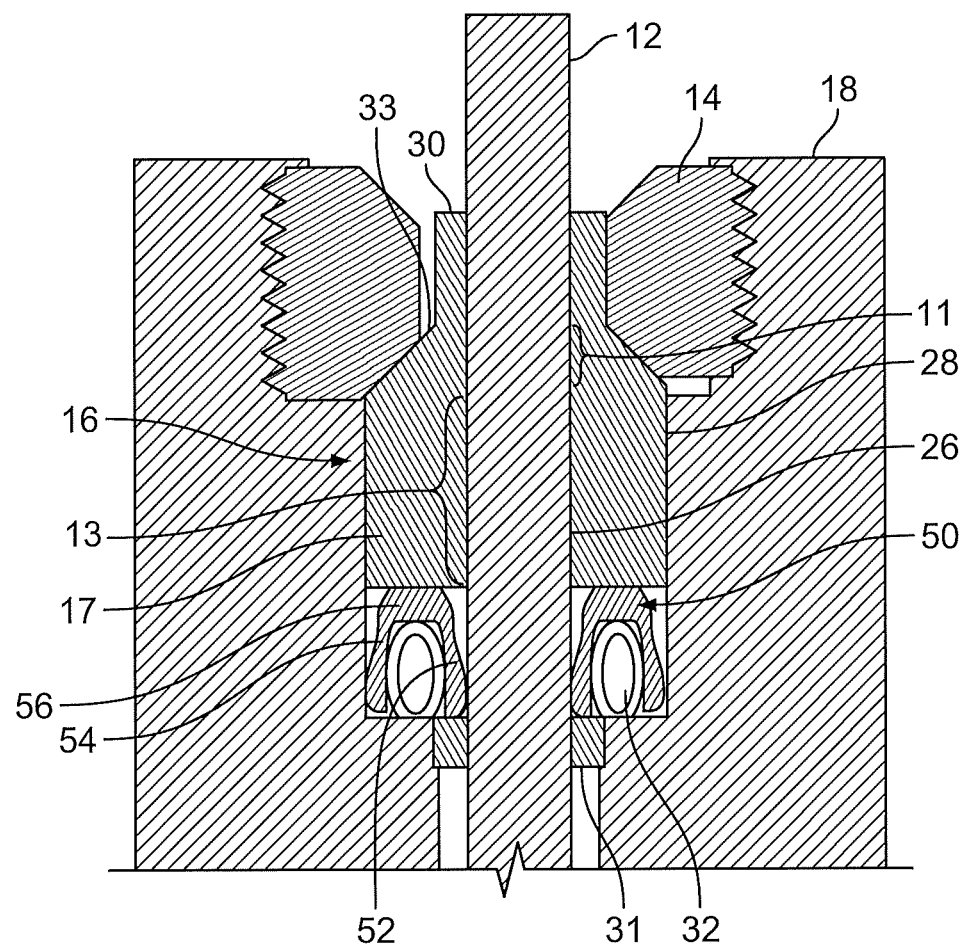
FIG. 2 is a schematic cross section of a first embodiment of a seal of a pump of the disclosure.

The section of the pump 10 including the annular seal 16 of a first embodiment is shown in further detail in FIG. 2 of the disclosure. The annular seal, indicated in general at 16, includes multiple components. The seal may include a primary sealing portion 17 and an initial sealing portion 50. The primary sealing portion includes a first portion having a generally trapezoidal cross section defining an annular surface and a first inner surface 11 adjacent the piston rod and a second portion having a second inner surface 13 adjacent the piston rod and an outer surface adjacent the pump housing. The initial sealing portion functions as a first engagement so that the gap between the piston and the primary seal is not expanded by the cryogenic liquid being pumped. Instead, the cryogenic liquid pushes the primary sealing portion into a sealing position, and then the primary sealing portion does the bulk of the sealing. The initial sealing portion may also include at least one coil spring component 32.

The primary sealing portion 17 may be shaped to effectively seal against the piston rod 12, housing 18 and retaining nut 14. A cross section of the primary sealing portion 17 may be generally trapezoidal in shape so that an annular surface, as indicated at 33 in FIGS. 2 (and 133 in FIG. 3, 233 in FIGS. 4 and 333 in FIG. 5), is defined. The primary sealing portion 17 includes two parallel sides including an inner surface 26 for placement against the piston rod 12 and an outer surface 28 for placement against the housing or cylinder 18. The primary sealing portion has a top surface 30 and bottom surface 31 extending between the inner and outer surfaces. The primary sealing portion 17 may also have extensions on the top and bottom from the base shape to fully seal the piston rod, piston housing and retaining nut of the pump.

The primary sealing portion 17 and the initial sealing portion 50 can be integrally connected, molded or otherwise integrally formed together. As examples only, the portions can be machined or compression molded together.

The primary sealing portion 17 may be composed of a variety of materials, or a mixture of materials. The material may be particularly useful for cryogenic applications. The material can be polytetrafluoroethylene, such as TEFLON, polyethylene such as high-density polyethylene, polyether ether ketones, or other known materials in the art, especially those that can withstand the low temperatures exhibited in cryogenic applications. The material may also be polychlorotrifluoroethylene which may be filled with a different substance or filler, for example, carbon, graphite, or any other reinforcing material to strengthen the seal. As another example, the primary sealing portion may be constructed of polytetrafluoroethylene and filled with carbon or graphite.

While the initial sealing portion is preferably constructed of the same material as the primary sealing portion, an alternative material may be used.

The initial sealing portion includes an inner wall 52 and an outer wall 54 so that an annular space is defined therebetween and a top wall 56 extending between the inner and outer walls. The initial sealing portion surrounds at least a portion of the coil spring 32.

There may be at least one coil spring 32. The coil spring is positioned within the annular space of the initial sealing portion (with the axis about which the spring coils are formed forming a ring that traverses the annular space) and configured so as to urge the inner wall into engagement with the piston rod and the outer wall into engagement with the pump housing. The coil spring can be comprised of different metals and metal alloys including, but not limited to, iron, nickel, copper, cobalt, titanium, stainless steel and combinations thereof. The coil spring can be of any type of applicable coil spring known in the art, including but not limited to, cantilever/v-spring, ribbon springs, and/or canted coil springs.

Figure 3:
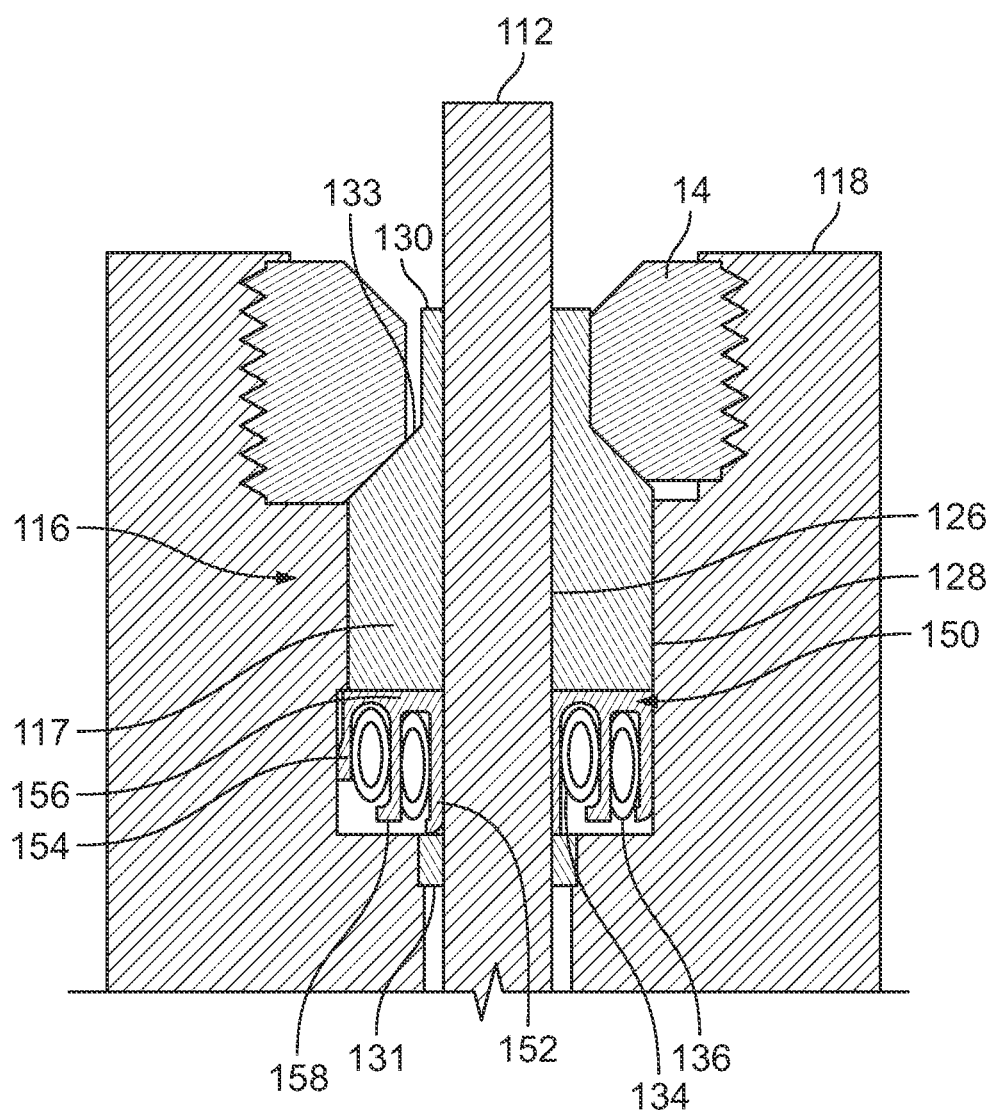
FIG. 3 is a schematic cross section of a second embodiment of a seal of a pump of the disclosure.
Figure 4:
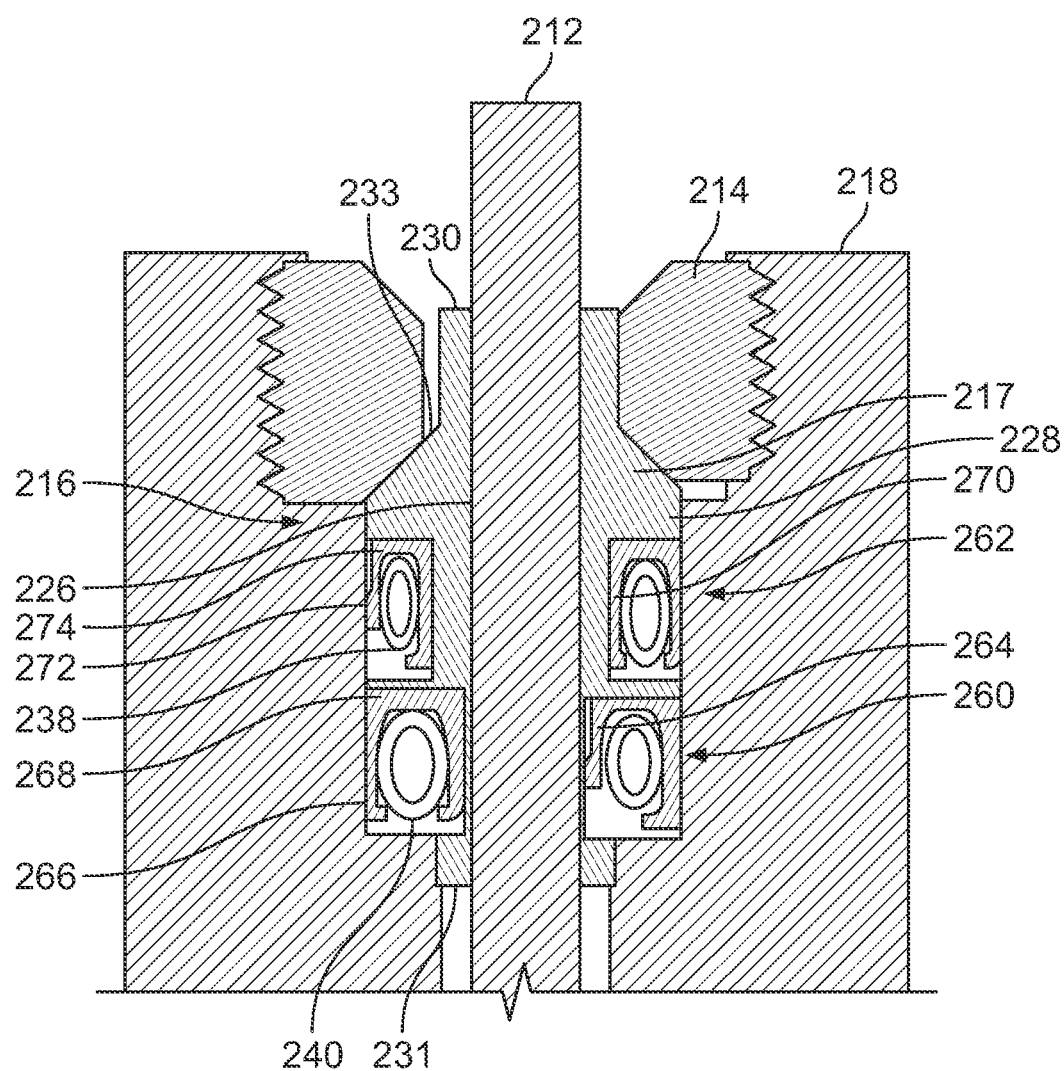
FIG. 4 is a schematic cross section of a third embodiment of a seal of a pump of the disclosure.

FIGS. 3 and 4 include alternate seal embodiments for pump 10 of the disclosure. Like components in FIGS. 3 and 4 are numbered similarly to FIG. 2 of the disclosure. Both FIGS. 3 and 4 include an additional coil spring, which may be arranged in a number of ways, including the positions illustrated in FIGS. 3 and 4. It is also within the scope of the disclosure to include even more additional coil springs located throughout the annular seal.

FIG. 3 illustrates an example arrangement in which two coil springs are placed within the annular seal 116 along a horizontal plane, with coil spring 134 placed more interior, closer to the piston rod 112 of the pump and inner surface 126 of the primary sealing portion 117 and coil spring 136 placed more exterior, closer to the housing 118 and outer surface 128. The initial sealing portion 150 surrounds at least a portion of the two springs, which are concentrically placed within the annular space between the inner wall 152 and outer wall 154 of the initial sealing portion 150 and configured so as to urge the inner wall into engagement with the piston rod and the outer wall into engagement with the pump housing. The initial sealing portion may include top wall 156 and also a middle wall 158 between the two springs.

FIG. 4 illustrates an example arrangement in which two coil springs are placed or stacked vertically in annular seal 216, with top coil spring 238 placed higher along the piston rod 212, closer to the top of the pump and top surface 230 of primary sealing portion 217 and bottom coil spring 240 placed lower along the piston rod, closer to the bottom of the pump and bottom surface 231 of the primary sealing portion 217. The top coil spring 238 may be within an annular space of a top initial sealing portion 262 between the inner wall 270 and outer wall 272 of the top initial sealing portion 262 and configured so as to urge the inner wall into engagement with the piston rod and the outer wall into engagement with the pump housing. The bottom coil spring 240 may be within an annular space of a bottom initial sealing portion 260 between the inner wall 264 and outer wall 266 of the bottom initial sealing portion 260 and configured so as to urge the inner wall into engagement with the piston rod and the outer wall into engagement with the pump housing. Each of the top and bottom initial sealing portions includes a top wall 274, 268.

Figure 5:
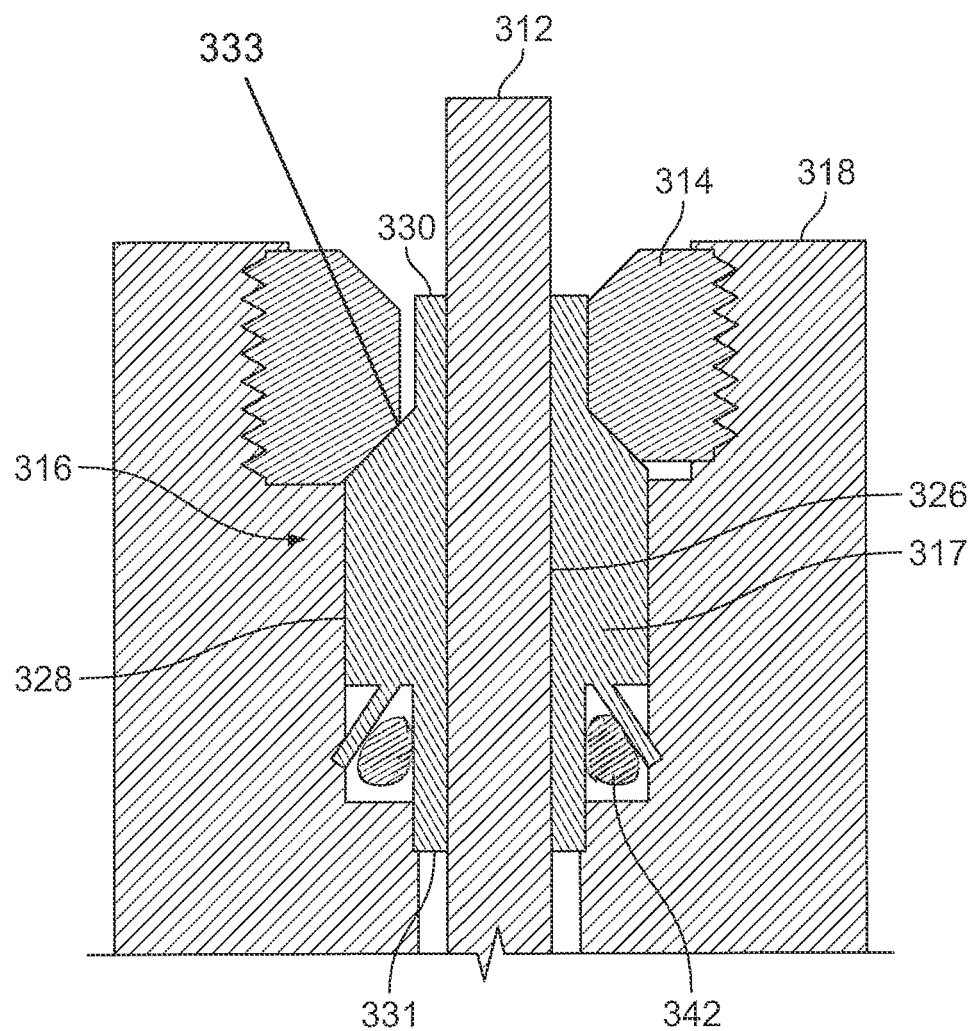
FIG. 5 is a schematic cross section of a fourth embodiment of a seal of a pump of the disclosure.

FIG. 5 provides an additional embodiment for a seal of the disclosure. Like components are numbered similarly to FIGS. 2-4 of the disclosure. The annular seal of FIG. 5, indicated in general at 316, includes a primary sealing portion 317 with inner surface 326 and outer surface 328. The primary sealing portion includes a top surface 330. The seal further includes an O-Ring component 342. Although a coil spring component is not shown in FIG. 5, it is within the scope of this disclosure to include an O-ring component and a coil spring component or components within the annular seal 316 of the disclosure. The O-ring component can be made from any of the material as described above in relation to the primary sealing or initial sealing portion. In a particular embodiment, the O-ring is comprised of polytetrafluoroethylene or Teflon.

The seals of current disclosure provide effective protection from leaking liquid. The seals and pumps of the disclosure may also include the benefit of longer sustainable wear without maintenance.

While the preferred embodiments of the invention have been shown and described, it will be apparent to those skilled in the art that changes and modifications may be made therein without departing from the spirit of the invention.

What is claimed is:

1. An annular seal for sealing an opening in a pump housing that surrounds a piston rod and receives a retaining nut comprising:
   a primary sealing portion including a first portion having a generally trapezoidal cross section defining an annular surface and a first inner surface adjacent the piston rod and a second portion having a second inner surface adjacent the piston rod and an outer surface adjacent the pump housing, said annular surface configured to seal against a retaining nut received within the pump housing opening;
   an initial sealing portion featuring an inner wall and an outer wall so that an annular space is defined therebetween and a top wall extending between the inner and outer walls;
   wherein the primary sealing portion and the initial sealing portion are integrally formed together; and
   a coil spring positioned within the annular space of the initial sealing portion and configured so as to urge the inner wall into engagement with the piston rod and the outer wall into engagement with the pump housing.

2. The annular seal of claim 1 wherein the primary sealing portion and the initial sealing portion are constructed of the same material.

3. The seal of claim 1, wherein the inner and outer surfaces of the primary sealing portion are parallel.

4. The seal of claim 1, wherein the primary sealing portion is comprised of a polytetrafluoroethylene.

5. The seal of claim 4, wherein the primary sealing portion is further comprised of at least one filler within the polytetrafluoroethylene.

6. The seal of claim 5, wherein the filler is carbon or graphite.

7. The seal of claim 1, wherein the coil spring is comprised of stainless steel.

8. The seal of claim 1, wherein the initial sealing portion is comprised of a polytetrafluoroethylene.

9. The seal of claim 8, wherein the initial sealing portion is further comprised of at least one filler within the polytetrafluoroethylene.

10. The seal of claim 9, wherein the filler is carbon or graphite.

11. The seal of claim 1, further comprising an additional coil spring.

12. The seal of claim 11, wherein the coil springs are located on a horizontal plane, with one placed closer to the inner surface of the primary sealing portion and one placed closer to the outer surface of the primary sealing portion.

13. The seal of claim 11, wherein the coil springs are located on a vertical plane, with one placed closer to the top surface of the primary sealing portion and once placed closer to the bottom surface of the primary sealing portion.

14. The seal of claim 13, wherein the initial sealing portion has a top initial sealing portion and a bottom initial sealing portion wherein one coil spring is placed within the annular space of each of the top initial sealing portion and the bottom initial sealing portion.

15. An annular seal for sealing an opening in a pump housing that surrounds a piston rod and receives a retaining nut comprising:
   a primary sealing portion including a first portion having a generally trapezoidal cross section defining an annular surface and a first inner surface adjacent the piston rod and a second portion having a second inner surface adjacent the piston rod and an outer surface adjacent the pump housing, said annular surface configured to seal against a retaining nut received within the pump housing opening;
   an initial sealing portion featuring an inner wall and an outer wall so that an annular space is defined therebetween;
   wherein the primary sealing portion and the initial sealing portion are integrally formed together; and
   an O-ring positioned within the annular space of the initial sealing portion and configured so as to urge the inner wall into engagement with the piston rod and the outer wall into engagement with the pump housing.

16. The seal of claim 15, wherein the O-ring is comprised of polytetrafluoroethylene.

17. The annular seal of claim 15 wherein the primary sealing portion and the initial sealing portion are constructed of the same material.

18. A pump for a cryogenic system comprising:
   a piston rod;
   a retaining nut;
   a pump housing having an opening that surrounds the piston rod and receives the retaining nut;
   a cylinder;
   an annular seal, wherein the annular seal comprises:
      a primary sealing portion including a first portion having a generally trapezoidal cross section defining an annular surface and a first inner surface adjacent the piston rod and a second portion having a second inner surface adjacent the piston rod and an outer surface adjacent the pump housing, said annular surface sealing against the retaining nut when received within the pump housing opening;
      an initial sealing portion featuring an inner wall and an outer wall so that an annular space is defined therebetween and a top wall extending between the inner and outer walls;
      wherein the primary sealing portion and the initial sealing portion are integrally formed together; and
      a coil spring positioned within the annular space of the initial sealing portion and configured so as to urge the inner wall into engagement with the piston rod and the outer wall into engagement with the pump housing.

19. The pump of claim 18, further comprising an inlet port in liquid communication with the cylinder for intaking cryogenic liquid and an outlet port in liquid communication with the cylinder for dispensing cryogenic liquid.

20. The pump of claim 18 wherein the primary sealing portion and the initial sealing portion of the annular seal are constructed of the same material.

* * * * *